United States Patent
Koch et al.

[11] 3,894,718
[45] July 15, 1975

[54] BALL VALVE

[75] Inventors: Ulrich H. Koch; Stephen Matousek, both of Moraga; Gary A. Soderlund; Dale N. Drake, both of San Pablo; Richard S. Digennaro, Berkeley, all of Calif.

[73] Assignee: Whitey Research Tool Co., Emeryville, Calif.

[22] Filed: Oct. 19, 1973

[21] Appl. No.: 408,183

[52] U.S. Cl. ................ 251/148; 251/172; 251/174
[51] Int. Cl. ............................................ F16k 25/00
[58] Field of Search .......... 251/170, 171, 172, 174, 251/148

[56] References Cited
UNITED STATES PATENTS

| | | | |
|---|---|---|---|
| 3,195,560 | 7/1965 | Pofit | 251/172 X |
| 3,244,398 | 4/1966 | Scaramucci | 251/315 X |
| 3,477,691 | 11/1969 | Griswold | 251/172 |
| 3,580,541 | 5/1971 | Bouhot | 251/172 X |
| 3,700,006 | 10/1972 | Marcillaud | 251/172 X |

FOREIGN PATENTS OR APPLICATIONS 577,699  5/1946  United Kingdom ................ 251/172

*Primary Examiner*—Harold W. Weakley
*Attorney, Agent, or Firm*—Fay & Sharpe

[57] ABSTRACT

The specification and drawings disclose a ball valve having an improved relationship between the ball and seat ring members. In general, the ball is mounted for selective rotation and limited axial movement in a valve body. Seat ring members are positioned on diametrically opposite sides of the ball about the inlet and outlet openings. The ring members are biased into engagement with the ball by conical disc springs. The springs are mounted between the seat ring members and annular flanges formed within the body. Sizing is such that in the normal assembled condition, the conical disc springs are compressed to a flat configuration in engagement throughout their diameter with the associated flange and act to maintain the radially inner portions of the seat rings in biased engagement with the ball under a predetermined minimum force.

8 Claims, 9 Drawing Figures

3,894,718

BALL VALVE

BACKGROUND OF THE INVENTION

The subject invention is directed toward the valve art and, more particularly, to an improved seal assembly for ball valves.

The invention is especially suited for use in a particular type of ball valve body, and will be described with reference thereto. However, as will become apparent, the invention is capable of broader application and could be used in ball valves having other types of bodies.

The typical ball valve in commercial use today uses annular seats or seal rings formed from a resilient and deformable plastic. A pair of seats are positioned in engagement with, and on opposite sides of, the ball about the inlet and outlet openings. Normally, the seats are designed to touch the ball in a narrow band or line and flex slightly under load. The ball itself is mounted for a slight amount of free movement axially of the seats.

When pressure is applied to the valve in the closed position, the ball moves axially in the body against the downstream seat. The downstream seat, of course, flexes slightly and the area of contact between the ball and the seat increases. The amount of flexing varies with pressure or seating force so that additional contact or seating area is provided for more support for the higher seating force.

With increasing pressure and downstream movement of the ball, the ball is moving away from the upstream seat. The ball contact with the upstream seat may or may not be broken, depending upon the pressure and/or the seat design. Some designs intentionally seal at the upstream seat while others deliberately prevent an upstream seal and do all the sealing on the downstream seat.

In the above described sealing action, the ball valve is functioning as a simple check valve. Substantially all contact pressure necessary to form a seal is provided by the fluid being sealed. The valve seat itself provides only a negligable sealing force.

There are problems or weaknesses present with the noted sealing principle. These problems relate, in general, to limitations imposed by the seat materials. As is known, a good seat material must have a low coefficient of friction and must be chemically inert to many different fluids. Additionally, the material should be relatively soft, pliable, and easily deformed. As a general rule, materials which possess the required properties have poor mechanical properties in terms of low tensile strength, low flex modulus, and high creep rate.

The poor mechanical properties inherent in most suitable seat materials present substantial problems. To explain, the seats in a newly-assembled valve provide a light seating contact force sufficient to seal at low pressures. However, this force is negligable when compared to the force generated by full-rated fluid pressure across the closed valve. Because of the mechanical properties of the seat material, once the valve has been used to seal against high fluid pressure, the seat typically deforms, creeps, and does not return to its original shape after the load is removed. Consequently, the initial light contact force is lost and the valve leaks at low pressure.

The subject invention overcomes the above-discussed problems and provides a ball valve and seat arrangement which permits the seats to be formed from a wide variety of materials to suit nearly every operating condition. Moreover, the arrangement is such that it compensates for seat wear, plastic deformation, or creep due to time and temperature.

BRIEF STATEMENT OF THE INVENTION

In general, the invention contemplates that the valve will comprise a body having a through passage. A valve ball is mounted for selective rotation and limited movement axially within the passage. Radially inwardly extending shoulders are located in the through passage on laterally opposite sides of the ball equal distances from each side thereof. A resilient annular seat is positioned about each opening between the ball and the shoulder. Additionally, a coned disc spring having a center hole larger than the respective opening is positioned between each packing and the respective shoulder. The spring and seat are sized and configured so that when the valve is originally assembled, each spring is compressed to a flat configuration in engagement with the respective shoulder and the associated packing engages the ball in a narrow annular band about its radially inner edge.

According to a more limited aspect of the invention, the seat ring members include an axially directed circumferential flange which locates or positions the associated disc spring. The flange can be located about the inner or outer periphery of the seat ring depending upon the material from which the ring is formed.

OBJECTS OF THE INVENTION

Accordingly, a primary object of the invention is the provision of a ball and seat assembly in which the seat members are maintained under a predetermined minimum force engagement with the ball by conical disc springs.

Another object is the provision of a valve of the type described wherein the conical disc springs are held in position by small flanges on the seats to form a unit for easy assembly.

A further object of the invention is the provision of a ball valve assembly which permits the seats to be formed from a wide variety of seat materials including materials which were previously considered unsatisfactory for ball valve seats.

A still further object of the invention is the provision of a ball valve of the general type described wherein wear of the seat rings is automatically compensated for by a conical disc spring acting against the radial inner area of each packing ring.

Yet another object is the provision of a valve seat assembly of the type described wherein the conical disc springs cannot be overstressed by high fluid pressures within the valve.

BRIEF DESCRIPTION OF THE DRAWINGS

The above and other objects and advantages will become apparent from the following description when read in conjunction with the accompanying drawings wherein.

DESCRIPTION OF PREFERRED EMBODIMENTS

Figure 1:
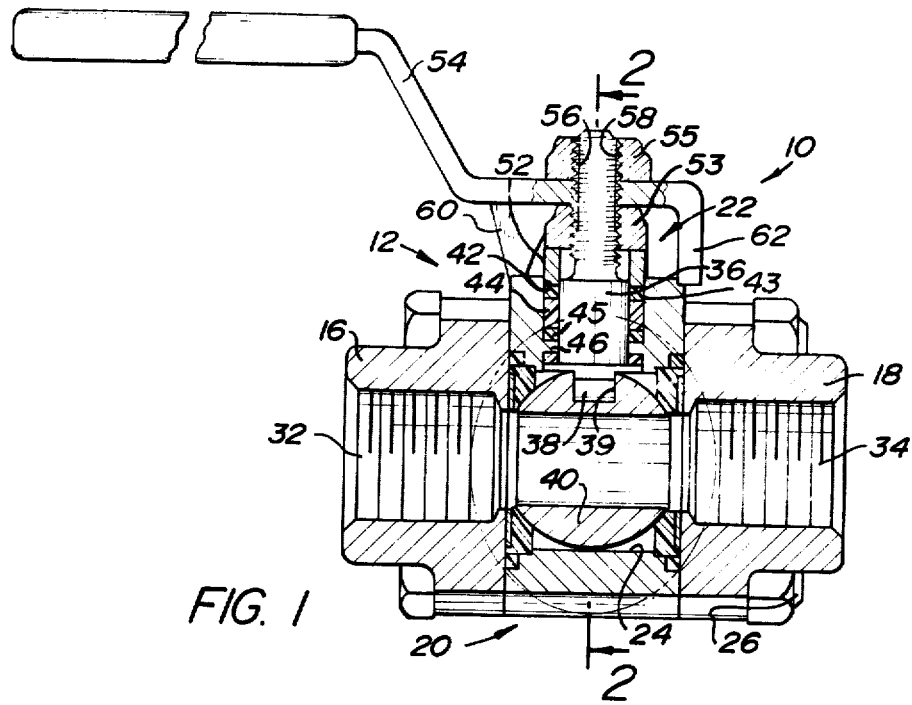
FIG. 1 is a cross-sectional view through a ball valve incorporating the preferred embodiment of the invention.
Figure 2:
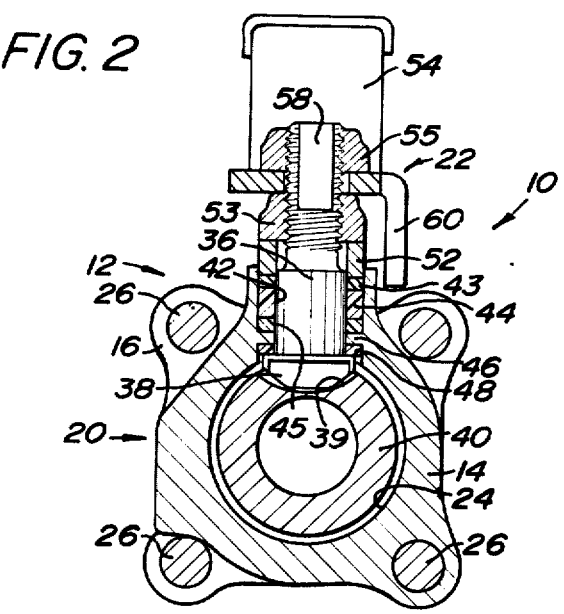
FIG. 2 is a cross-sectional view taken on line 2—2 of FIG. 1.

Referring more particularly to the drawings wherein the showings are for the purpose of illustrating a preferred embodiment of the invention only, and not for the purpose of limiting same, FIGS. 1 and 2 best illustrate the overall arrangement of a ball valve assembly 10 which includes a body or housing 12 including a main or central body section 14 and end fittings 16 and 18. A ball and seat assembly 20 is mounted generally centrally within the main body section 14 and is arranged for selective rotation by a stem and actuating handle assembly 22.

The details of all portions of the valve illustrated in FIGS. 1 and 2 except for the ball and seat assembly are described in detail in commonly assigned, copending U.S. patent application for "Fluid System Device" filed on Oct. 15, 1973, Ser. No. 406,272, and incorporated herein by reference. In general, however, the valve body of the subject embodiment includes a generally cylindrical central passage or axially extending opening 24 which is only slightly larger in diameter than the ball member. Each of the end fittings 16 and 18 are releasably connected to the central body section 14 by longitudinally extending tie bolts 26. The end fittings 16 and 18 are provided with internal threads 32, 34 to allow the valve to be connected to the associated piping. As discussed and described more fully in the aforementioned patent application, the central body section is arranged so that by removal of tie bolt 26a, the center section can be pivoted from between the end fittings for removal and replacement of the valve ball and the seat ring members.

The stem and actuating assembly 22 as illustrated includes a stem member 36 having a lower end 38 shaped as shown and received in a slot or groove 39 formed in the ball 40. This arrangement allows the ball to be rotated while permitting the ball to have some freedom for movement axially in the body when the ball is in the closed position.

The stem member 36 extends outwardly through an opening 42 formed in the central body section 14. Suitable packing ring members 43, 44 and 45 are positioned in the opening 42 and sealingly engage the walls of the opening and the stem 36. As shown, the lower packing ring 45 rests upon an inwardly extending flange 46 formed within opening 42. A split thrust washer member 48 is positioned below flange 46 and clamped thereto by an outwardly extending shoulder or flange 50 formed on stem 36. The stem is held in position by a packing gland 52 and a packing nut 53. As shown, tightening of packing nut 53 applies pressure to the packing rings 43–45 to assure a fluid-tight seal about the stem.

Although the valve stem could be actuated by many different types of actuators, either manual or automatic, in the subject embodiment a handle member 54 is releasably connected to the stem 36 by a nut member 55 which clamps the handle to the top of the packing nut. Cooperating flats 56 and 58 are formed in the handle opening and on the exterior of the outer end of the stem respectively.

The position of the handle and, accordingly, the position of the ball 40 are limited by depending stop members 60, 62 carried by the handle 54. The stop members engage suitable surfaces on the central body section to provide fixed stops for the valve in the full open and full closed positions.

Figure 3:
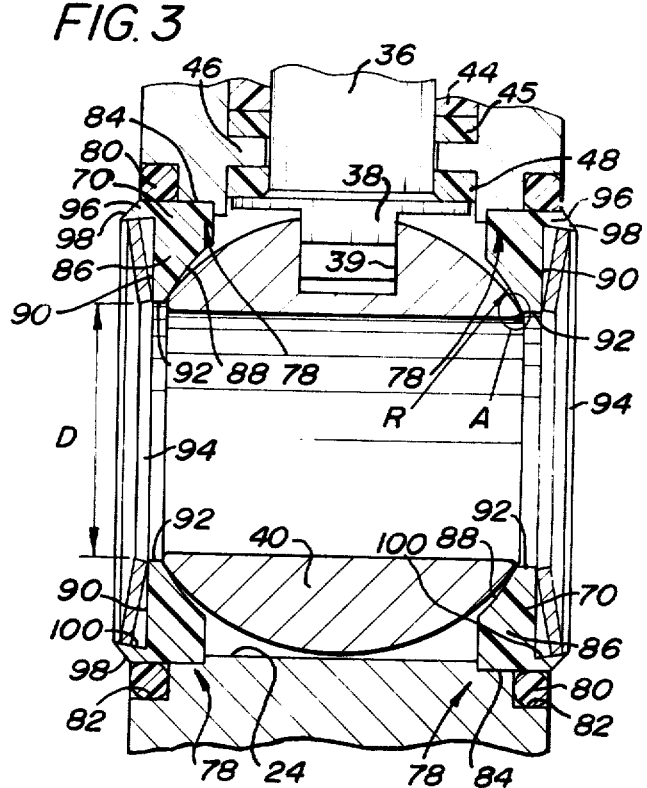
FIG. 3 is an enlarged view showing the circled area of FIG. 1 prior to the time the end flanges are assembled in position.
Figure 4:
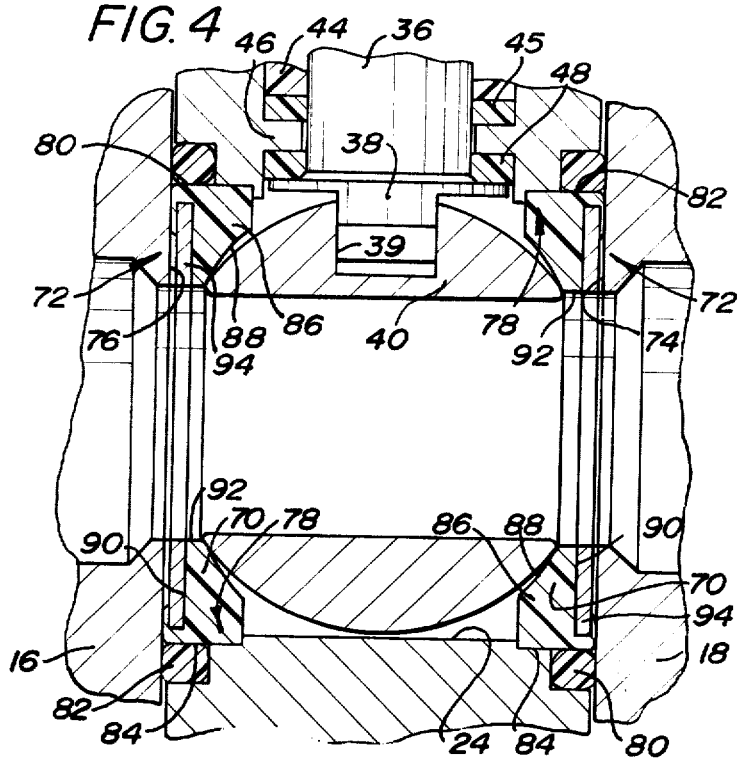
FIG. 4 is a view similar to FIG. 3 but showing the ball and seal or seat arrangement after the end flanges have been properly tightened or assembled.
Figure 5:
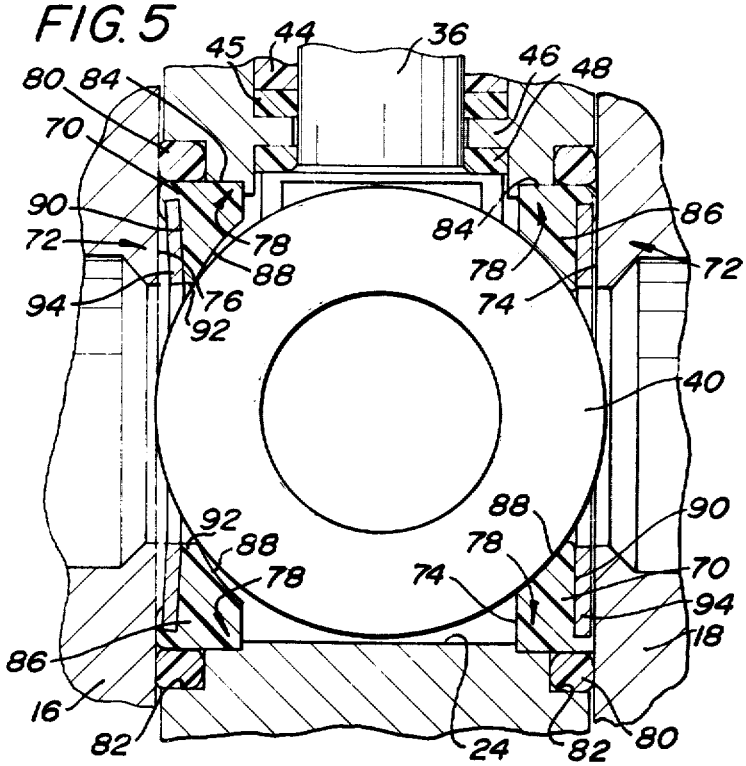
FIG. 5 is a view similar to FIG. 3 but showing the ball and seat arrangement after the end flanges have been assembled but with the ball closed and under pressure conditions.
Figure 6:
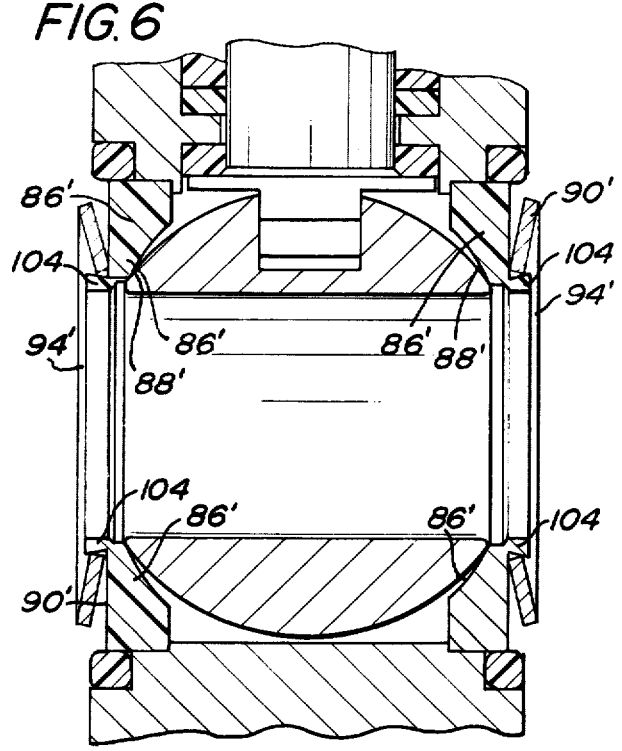
FIG. 6 is a view similar to FIG. 3 but showing a modified form of seat or seal ring.
Figure 7:
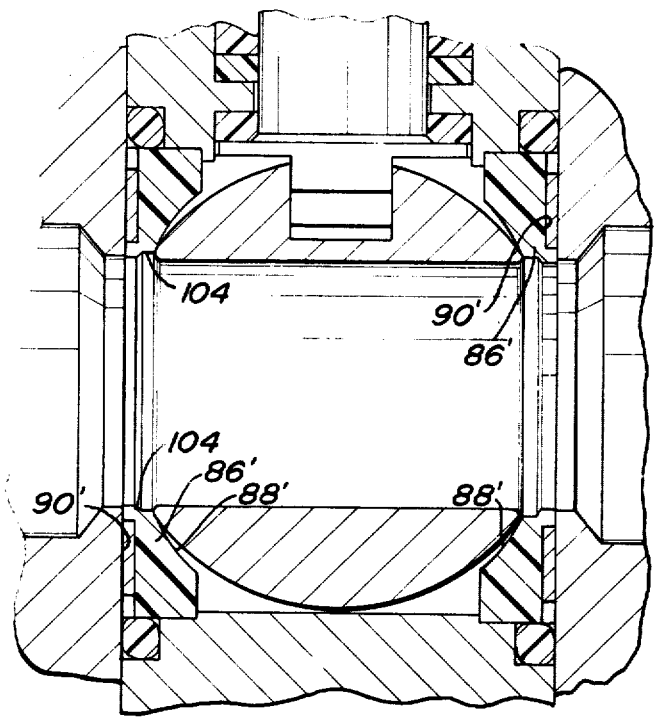
FIG. 7 is a view showing the seat of FIG. 6 after it has been assembled in the valve.
Figure 8:
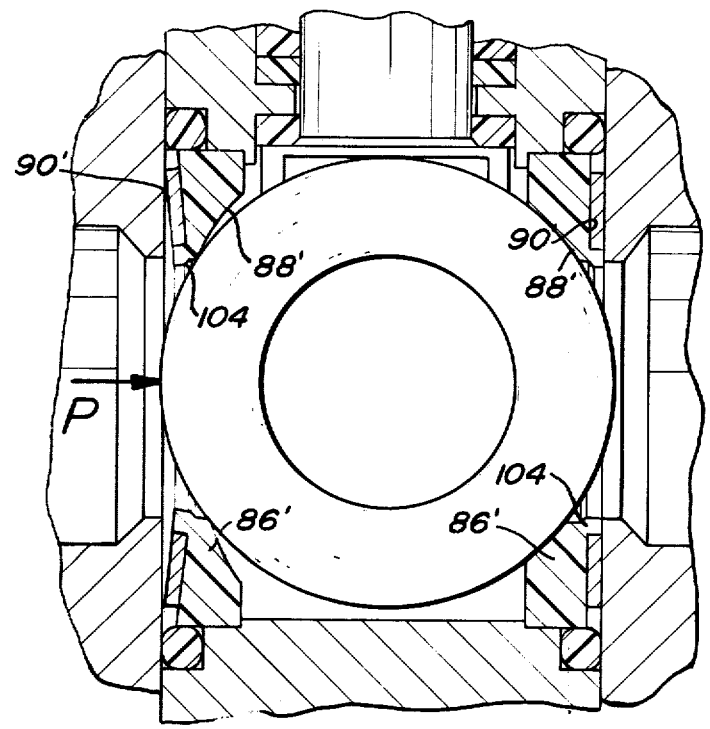
FIG. 8 is a view of the seat of FIG. 6 but showing it with the valve closed and under fluid pressure conditions.

As previously mentioned, the general overall arrangement thus far described is more fully described and claimed in the previously mentioned, commonly assigned, copending application. Of particular importance to the subject invention, however, is the relationship of the ball and seat assembly 20. Referring more particularly to FIGS. 3–5, ball seat assembly 20 is shown as including the previously mentioned ball member 40 and a pair of seat or seal ring members 70. As shown, the seat rings 70 are clampingly held in position on opposite sides of the ball adjacent the opposite ends of the central body opening 24. In the embodiment under consideration, the seat rings are located substantially equal distances on diametrically opposite sides of the axis of rotation of the ball 40. Although the seat rings could be held in position by many different arrangements, in the subject embodiment they are located by shoulders 72 defined by the faces 74, 76 of the end fittings 16 and 18. Additionally, it should be noted that the inward limit of movement of the seat rings is defined by a pair of shoulders 78 formed by counterbores extending inwardly of central opening 24. Additionally, a seal is provided between the central body section and the flanges or end fittings 16 and 18 by O-ring members 80 which are received in second counterbores 82 and which tightly engage about the outer circumference or outer surfaces 84 of the seat rings 70. Each seat ring comprises a main body 86 which, in the preferred embodiment, is formed from a resilient plastic such as nylon, Delrin, or Teflon. It should be appreciated, however, that other types of materials could be used to form the main body of the seat ring. The particular material chosen will, of course, depend upon the operating conditions to which the valve is to be subjected. The main seat body 86 includes a first inner face 88 which is preferably of concave spherical configuration as shown. It should be noted that surface 88 is of a radius R which is slightly greater than the radius of the ball 40. The seat body additionally includes a second face 90 which extends generally parallel to the associated fitting faces 74, 76. The two faces 88 and 90 are joined by a comparatively short surface 92 which, in the subject embodiment, is shown merely as a straight cylindrical surface. Positioned between surface 90 and faces 74, 76 is a conical disc spring member 94 which preferably has an inner diameter D substantially equal to the inner diameter of the opening through the seat ring member.

Referring to FIG. 3, the relationship of the main body 86, the disc spring 94, and the ball 40 are shown prior to the time that the end fitting members are in their proper position. As can be seen, the normal unstressed position of the disc spring is such that its smaller diameter end is directed toward the ball. Thus, the load applied by the spring to the seat member is directed generally toward the radial innermost portion of the seat. This causes the seat to engage the ball throughout an initial contact area A. Preferably, the spring is selected so that its force is sufficient at maximum deflection to provide a moderately low sealing pressure such as would result from a fluid line pressure in the range of 100 to 200 psi. Consequently, the valve is always sealed with a substantial minimum contact force, irrespective of the actual sealing pressure produced by fluid acting against the ball and forcing it against the downstream seat. With the ball in a closed position and higher fluid pressures acting against the ball, the ball is forced harder against the downstream seat tending to cause elastic (or even plastic) deformation of the seat to increase the contact area and distribute the load over a larger seat area as illustrated in FIG. 5. Under these higher pressures, the spring is not effected because it is supported across its entire width by the surface 74 and cannot be stressed beyond the stress level related to maximum deflection.

Figure 9:
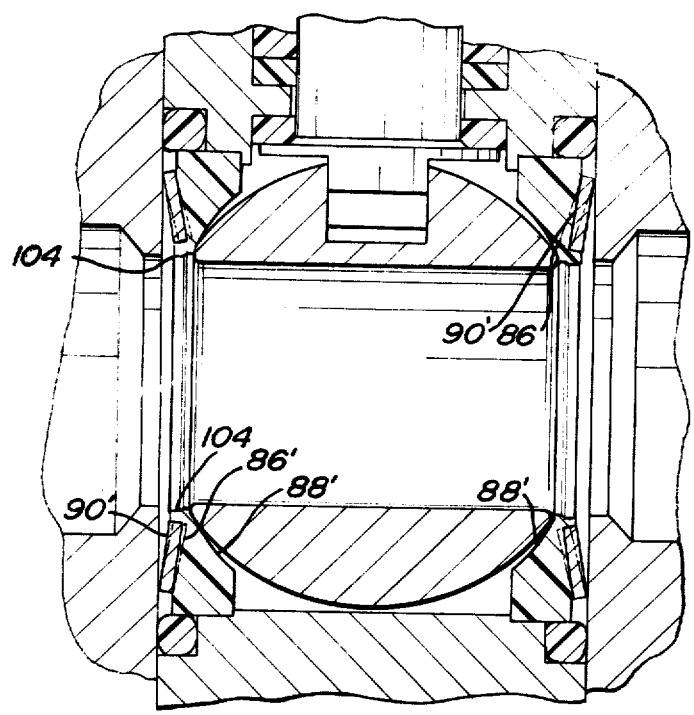
FIG. 9 is a view showing the seat of FIG. 6 after substantial wear has taken place on the seat.

As the valve is used and the seat material wears, undergoes plastic deformation, or creeps due to time and temperature, the spring compensates for this within its range of deflection as illustrated by dash-dot lines in FIG. 9. Note that the spring acts to maintain the seats in engagement with the ball under a predetermined minimum load up to the point where it is fully deflected. Depending upon the design parameters, the seat can function to maintain a suitable sealing pressure between the ball and the seat until there is substantially no seat material remaining between the ball and the effective portion of the spring. Because of the addition of the mechanical spring to the seat and its relationship to the ball and the associated shoulder, the subject arrangement allows the use of an extremely wide choice of seat materials. This is particularly advantageous since the ordinary valve seat materials are generally limited to moderate pressures and low temperatures. Materials which are strong enough to use at higher pressures or which retain their strength at high temperature are generally too rigid and hard to seat well. The addition of the spring and positive sealing force to the system permits these materials to become practical. By adding a positive sealing force to the system, materials which could previously not be used as valve seats can now be incorporated in the valve. Additionally, with the subject invention, valve life is greatly extended. Previously, a small amount of wear on a seat would cause the seat to become loose and not seal. In the subject device, the deflection of the spring provides a relatively larger reserve of travel to compensate for wear. Also, the sealing force produced by the spring is immune to the effects of chemicals, solvents, and temperature which have a very large effect on typical, commonly used seat materials.

Referring again to FIG. 3, it will be noted that a lip 96 having a beveled outer surface 98 extends axially from the surface 90. The lip 96 is preferably continuous about the seat body 86 and located so that its radial inner surface 100 is at a diameter corresponding to the outer diameter of the disc spring member 94. During assembly, the lip 96 serves to locate the disc spring relative to the seat. Additionally, the lip is inclined as shown to lock the disc in position for ease of handling and assembly. When the end fittings are moved into proper final position (as shown in FIGS. 4 and 5), the lip 96 is rolled over the radial outer edges of the disc spring. Preferably, the axial thickness of the seat body 86 is such that tightening of the end fittings causes the two seats to be tightly clamped in position in the counterbore. In addition to holding the seat in proper orientation, a seal is also developed between the seat and the central body section.

Many of the structural details of the spring and the seat can vary since the spring and the seat must be designed as a system to suit the mechanical properties of each piece. For example, the thickness and cone angle of the spring can be varied to provide essentially the same spring characteristics regardless of the spring metal used. Generally, however, these will constitute very small changes since most metals have spring properties which fall within a narrow range. The design of the seat element itself depends on the seat material. The cross-section of the seat can vary depending on the strength and stiffness inherent in the seat material. The seat material properties, particularly hardness and flexual modulus, determine the amount of spring force needed to produce a predetermined initial contact seal. This force will often vary substantially among seat materials and spring design must be tailored to meet these requirements.

The arrangement shown in FIGS. 6–9 operates with substantially the same principals as the FIGS. 1–5 embodiment. In this embodiment, like reference numerals have been used to identify the same or corresponding parts. However, they are differentiated from the reference numerals of the first embodiment by the addition of a prime (') suffix. Unless otherwise noted, a description of one such element is to be taken as equally applicable to the other. In the FIGS. 6–8 embodiment, the seat members 86' have the same general overall configuration as the seats 86 of FIGS. 1–5 embodiment. However, the previously-discussed lip 96 is eliminated and an inner lip 104 is formed about the inner portion of each seat in the manner shown. This lip also serves to locate the disc spring 94'. Lip 104 is short and sized to fit in the space around the flow passages. Additionally, lip 104 is not required to deform as illustrated with respect to the previously-mentioned lip 96. Seats having the configuration of FIGS. 6–9 are particularly suitable for use with hard seat materials where an outer lip of the type 96 would not crush or deform but, rather, would push the seat into the central opening in the central body section and deform the seat out of its desired shape. However, the inside lip-type of FIGS. 6–9 is not particularly suitable for use with soft seat materials. The reason for this is that when the valve is opened under high pressure, the velocity of flow past the inside lip tends to tear it away from the seat. This, however, does not happen when the inside lip is used on harder, more high-strength materials.

As mentioned earlier, valves of the type under consideration can be arranged so that a seal is maintained on both seat rings throughout the entire working range of fluid pressures. Alternatively, the valves can be arranged to perform most sealing functions on the downstream seal. The preferred form for the subject invention comprises maintaining a seal on the upstream seat throughout the lower portion of the operating pressure range and thereafter having the downstream seat perform the sealing functions. This can best be understood by reference to FIG. 5. To explain, assume that the valve of FIG. 5 is in the closed position. On low pressures, the biasing action of the spring member 94 will maintain the seal ring in sealing engagement with the ball even though the ball has moved a slight amount in the downstream direction due to pressure P acting against the exposed upstream face of the ball. As the fluid pressure increases, the ball is moved further downstream and the area of the downstream face 88 engaged by the ball increases, thereby increasing the support area for the higher pressure. The further movement of the ball away from the upstream seat causes the contact pressure between the upstream seat and the ball to diminish and finally a seal is no longer maintained. At this time, however, the sealing pressure against the downstream seat is at a maximum. Because of the increased force between the ball and the downstream seat, increased deformation of the downstream seat would normally be expected. However, because of the shape of the downstream seat together with the fact that it is supported fully across its outer face 90 by the spring 94 and the flange, no substantial deformation of the seat takes place. When the fluid pressure acting against the ball reduces, the spring 94 on the downstream seat functions to maintain a predetermined contact force between the seat and the ball. The spring itself cannot be overstressed because of the presence of the shoulder. As a consequence, a material having a low tensile strength and a low flex modulus, together with a high creep rate, can be used as a seat.

The invention has been described in great detail sufficient to enable one of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A valve comprising:
   a body having a central passage of generally cylindrical cross-section;
   a ball valve member positioned in said passage and mounted for selective rotation about an axis extending perpendicular to the axis of said passage, said ball mounted for limited movement in directions axially of said passage;
   a pair of radially inwardly extending shoulders in said passageway located generally equal distances from said ball on opposite sides thereof, each said shoulder being circumferentially continuous and having a surface facing said ball which is substantially perpendicular to the axis of the passageway;
   a pair of resilient seat ring members with one of said ring members positioned between each shoulder and the ball member, each seat ring member having a central opening and a first continuous surface facing said ball and a second continuous surface facing said shoulder, said first surface being of concave spherical configuration of a radius greater than the radius of said ball member and said second surface being generally planar and extending generally parallel to said shoulder;
   a disc spring between the second face of each ring and the associated shoulder, each disc spring having a central opening and in its unstressed condition having a truncated conical shape, each disc being positioned with its smaller diameter end pointing toward the ball and sized so that when the ball member, the seat ring members, and the disc springs are assembled between the shoulders, the disc springs are stressed to a flat configuration against the shoulder, and only the radial innermost portion of the first surface of each seat ring is biased against the ball member under a predetermined load, the remaining portion of the first surface being spaced from the ball because of its concave spherical configuration having a radius greater than the radius of the ball member.

2. The valve as set forth in claim 1 wherein said body includes removable end fittings and wherein said shoulders are defined by said end fittings.

3. The valve as set forth in claim 1 wherein said resilient seat ring members each include an axially extending circumferential flange which locates and lockingly holds the associated disc spring.

4. The valve as set forth in claim 3 wherein said flange is located to engage about the opening in said disc spring.

5. The valve as set forth in claim 3 wherein said flange is located to engage about the outer circumference of said disc spring.

6. The valve as defined in claim 5 wherein the opening in each said spring is substantially equal to the opening in each said resilient seat.

7. The valve as defined in claim 5 wherein the flange of each said resilient seat ring extends into engagement with the outer periphery of the associated spring disc.

8. The valve as defined in claim 4 wherein the flange of each said resilient seat ring extends into engagement with the inner periphery of the associated spring disc.

* * * * *